United States Patent
Lu et al.

(10) Patent No.: US 6,817,086 B2
(45) Date of Patent: Nov. 16, 2004

(54) PHOTOLITHOGRAPHIC PROCESS FOR EXTREME RESOLUTION OF TRACK WIDTH DEFINITION OF A READ HEAD

(75) Inventors: Jennifer Qing Lu, San Jose, CA (US); Scott Arthur MacDonald, San Jose, CA (US); Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 10/217,921

(22) Filed: Aug. 12, 2002

(65) Prior Publication Data

US 2002/0189078 A1 Dec. 19, 2002

Related U.S. Application Data

(63) Continuation-in-part of application No. 09/853,345, filed on May 10, 2001.

(51) Int. Cl.[7] ............................ G11B 5/127; H04R 31/00
(52) U.S. Cl. ................. 29/603.15; 29/603.07; 29/603.13; 29/603.14; 29/603.16; 29/603.18; 360/324; 360/325; 360/326; 360/327; 216/62; 216/65; 216/66; 204/192.15; 427/79; 427/80
(58) Field of Search ............ 29/603.07, 603.14–603.16, 29/603.18; 360/324–327; 216/62, 65, 66; 451/5, 41; 204/192.15; 427/79, 80

(56) References Cited

U.S. PATENT DOCUMENTS 4,803,580 A * 2/1989 Mowry ........................ 360/317
5,491,600 A * 2/1996 Chen et al. .................. 360/322
5,665,251 A    9/1997 Robertson et al. ............ 216/22
6,069,775 A    5/2000 Chang et al. ................ 360/126
6,218,056 B1 * 4/2001 Pinarbasi et al. .............. 430/5
6,249,406 B1 * 6/2001 Gill et al. ................ 360/324.11

FOREIGN PATENT DOCUMENTS

JP            10256623 A  *  9/1998   ............ H01L/43/08
WO       WO 00/36594        6/2000   ............ G11B/5/31

OTHER PUBLICATIONS

"A new write head trimmed at wafer level by focused ion beam"; Koshikawa, T.; Nagai, A.; Yokoyama, Y.; Hoshino, T.; Ishizuki Y.; Magnetics, IEEE Transactions on , vol.: 34 , Issue: 4, Jul. 1998; pp.:1471–1473.*

U.S. patent application Ser. No. 09/853,345, Fontana et al., filed May 10, 2001.

* cited by examiner

Primary Examiner—A. Dexter Tugbang
Assistant Examiner—Paul D Kim
(74) Attorney, Agent, or Firm—Ervin F. Johnston (57) ABSTRACT

A bilayer mask employed for lift off has a top strip which bridges between first and second bilayer portions and is completely undercut so that when one or more materials is sputter deposited the materials do not form fences abutting recessed edges of a bottom layer in undercuts below a top layer. Sacrificial protective layers are formed on a sensor and lead layers for protecting these components while overlapping portions of these materials on the top of the sensor formed during deposition can be removed by ion beam sputtering, after which the sacrificial protective layers can be removed by ion milling or reactive ion etching.

12 Claims, 7 Drawing Sheets

FIG. 1
(ABS)

PHOTOLITHOGRAPHIC PROCESS FOR EXTREME RESOLUTION OF TRACK WIDTH DEFINITION OF A READ HEAD

CROSS-REFERENCE TO RELATED APPLICATION

This is a continuation-in-part application of commonly owned copending application Ser. No 09/853,345 filed May 10, 2001.

BACKGROUND OF THE INVENTION

1. Field of the Invention

The present invention relates to a photolithographic process for extreme resolution of a track width definition for a read head and, more particularly, to a bilayer lift off photolithographic process which obviates fencing after backfilling with one or more read head layers.

2. Description of the Related Art

The heart of a computer is a magnetic disk drive which includes a magnetic disk, a slider that has read and write heads, a suspension arm and an actuator arm that swings the suspension arm to place the read and write heads adjacent selected circular tracks on the disk when the disk is rotating. The suspension arm biases the slider into contact with the surface of the disk or parks it on a ramp when the disk is not rotating but, when the disk rotates and the slider faces the rotating disk, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic field signals to and reading magnetic field signals from the rotating disk. The read and write heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or zero bias point position in response to positive and negative magnetic field signals from the rotating magnetic disk. The quiescent position, which is parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient $dr/R$ where $dr$ is the change in the resistance of the sensor as the magnetic moment of the free layer structure rotates from a position parallel with respect to the magnetic moment of the pinned layer structure to an antiparallel position with respect thereto and $R$ is the resistance of the sensor when the magnetic moments are parallel.

In addition to the spin valve sensor the read head includes nonmagnetic electrically nonconductive first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The areal density of a read head is a measure of the number of bits per square inch that the read head is capable of sensing on the rotating magnetic disk. Areal density is a product of linear density, which is the number of bits per inch along a circular track of the rotating magnetic disk, and track width density, which is the number of tracks per inch along a radius of the rotating magnetic disk. The linear density is quantified as bits per inch (BPI) and the track width density is quantified as tracks per inch (TPI).

The track width of a read head is typically formed with a bilayer photoresist. After forming sensor material layers a first layer of inorganic or organic material, such as photoresist, which is a non-actinic polymer, is applied by spin coating on the wafer and then subjected to a soft bake to remove casting solvents. Next, a second inorganic or organic material, such as photoresist, which is an actinic photoresist, is spun onto the wafer and soft baked. Assuming that the second photoresist layer is a positive photoresist the second photoresist layer is light imaged with a mask preventing exposure of the light to the second photoresist layer portion that is to be retained. The first and second photoresist layers are then subjected to a dissolver, which is a basic solution. The dissolver first dissolves the light exposed portions of the second photoresist layer down to the first photoresist layer and then proceeds to dissolve the first photoresist layer causing an undercut below the second photoresist layer. The dissolution is terminated when a desired undercut is obtained with the second photoresist layer overhanging the first photoresist layer on each side of the first photoresist layer. Accordingly, the width of the second photoresist layer defines the track width of the read head and the first photoresist layer permits the first and second photoresist layers to be lifted off with any layers deposited thereon, which is described hereinbelow.

After forming the bilayer photoresist on the sensor material layers ion milling is implemented to remove exposed portions of the sensor material layers leaving a sensor material layer portion below the bilayer photoresist that has a width equal to the desired track width of the read head. The space on each side of the bilayer photoresist is then backfilled with read head layers, such as first and second hard bias layers and first and second lead layers, with the first hard bias layer and the first lead layer abutting a first side surface of the sensor and the second hard bias layer and the second lead layer abutting a second side surface of the sensor. The hard bias layers and the lead layers are typically deposited by ion beam deposition since the deposition is more collimated than sputter deposition. Even so, a portion of the deposition enters the undercut on each side of the bilayer photoresist and overlaps first and second end portions of the sensor. Even when the thickness of the first photoresist layer is kept very thin, such as 700 Å, the penetration of the deposited materials will be about 0.1 $\mu$m per side. Accordingly, the length of each undercut cannot be smaller than 0.1 $\mu$m for each side. If the length of the undercut is less than 0.1 $\mu$m per side two major problems will be present. The first problem is that when an undercut is less than 0.1 $\mu$m the deposited material will adhere to the recessed edge of the first photoresist layer causing the deposited material to form a spike or fence which extends upwardly. These fences present a problem when the second read gap layer is formed after completion of the sensor and the hard bias and lead layers. If the second read gap layer is made thick enough to prevent a shorting between the fence and the second shield layer this increases the read gap and thereby decreases the linear read bit density of the read head. The second problem with the undercut having a length less than 0.1 $\mu$m per side is that process variations can cause one side of the bilayer photoresist to have an undercut while the other side has no undercut. These factors then limit the track width of the read head to values of 0.3 $\mu$m or larger. This prior art photolithographic process has not permitted track widths smaller than 0.3 $\mu$m.

The same bilayer photoresist scheme as described hereinabove may be employed except the first photoresist layer below the second photoresist layer in the track width region of the sensor is completely dissolved by the dissolver so that a strip of the second photoresist in the track width region with a width equal to the desired track width of the read head bridges between first and second portions of the bilayer photoresist. This is accomplished by subjecting the bilayer photoresist to the dissolver for a sufficient period of time to completely remove the first photoresist portion below the second photoresist strip in the track width region. This then frees the track width to be reduced to a level sufficient only for the self-support of the second photoresist strip, which is on the order of 0.1 $\mu$m. Accordingly, read heads can be made with track widths down to 0.1 $\mu$m.

After forming the bilayer photoresist on the sensor material layers with the second photoresist strip bridging across where the sensor is to be formed, ion milling is again implemented to remove exposed sensor material portions on each side of the strip. The milled away areas on each side of the strip are then backfilled with the first and second hard bias layers and the first and second lead layers. Unfortunately, the deposited material will overlap portions of the sensor below the strip which alters the desired track width of the sensor.

SUMMARY OF THE INVENTION

In order to overcome the aforementioned problem of a lead layer overlapping the sensor the present invention forms a protective sacrificial layer, such as carbon, on the sensor material layers before forming the bilayer photoresist. After forming the bilayer photoresist and after forming the first and second hard bias layers and the first and second lead layers, a second sacrificial protective layer is deposited on top of the first and second lead layers. After removal of the bilayer photoresist the portions of the first and second hard bias layers and the first and second lead layers that overlap the sensor are not protected by either one of the first and second sacrificial protective layers. Ion milling is then implemented to remove the portions overlapping the sensor while the first and second sacrificial protective layers protect the spin valve sensor and the first and second lead layers respectively. Any remaining first and second sacrificial layers may then be removed by reactive ion etching (RIE), such as oxygen RIE. The read head may then be completed by forming the second gap layer and the second shield layer.

An object of the present invention is to provide a bilayer photoresist mask which does not cause fencing of hard bias and lead materials deposited into undercuts of the bilayer photoresist when the track width of a read sensor is 0.3 $\mu$m or less and a scheme to permit removal of lead layer material overlapping the read sensor.

Other objects and attendant advantages of the invention will be appreciated upon reading the following description taken together with the accompanying drawings.

DESCRIPTION OF THE PREFERRED EMBODIMENTS

Figure 1:
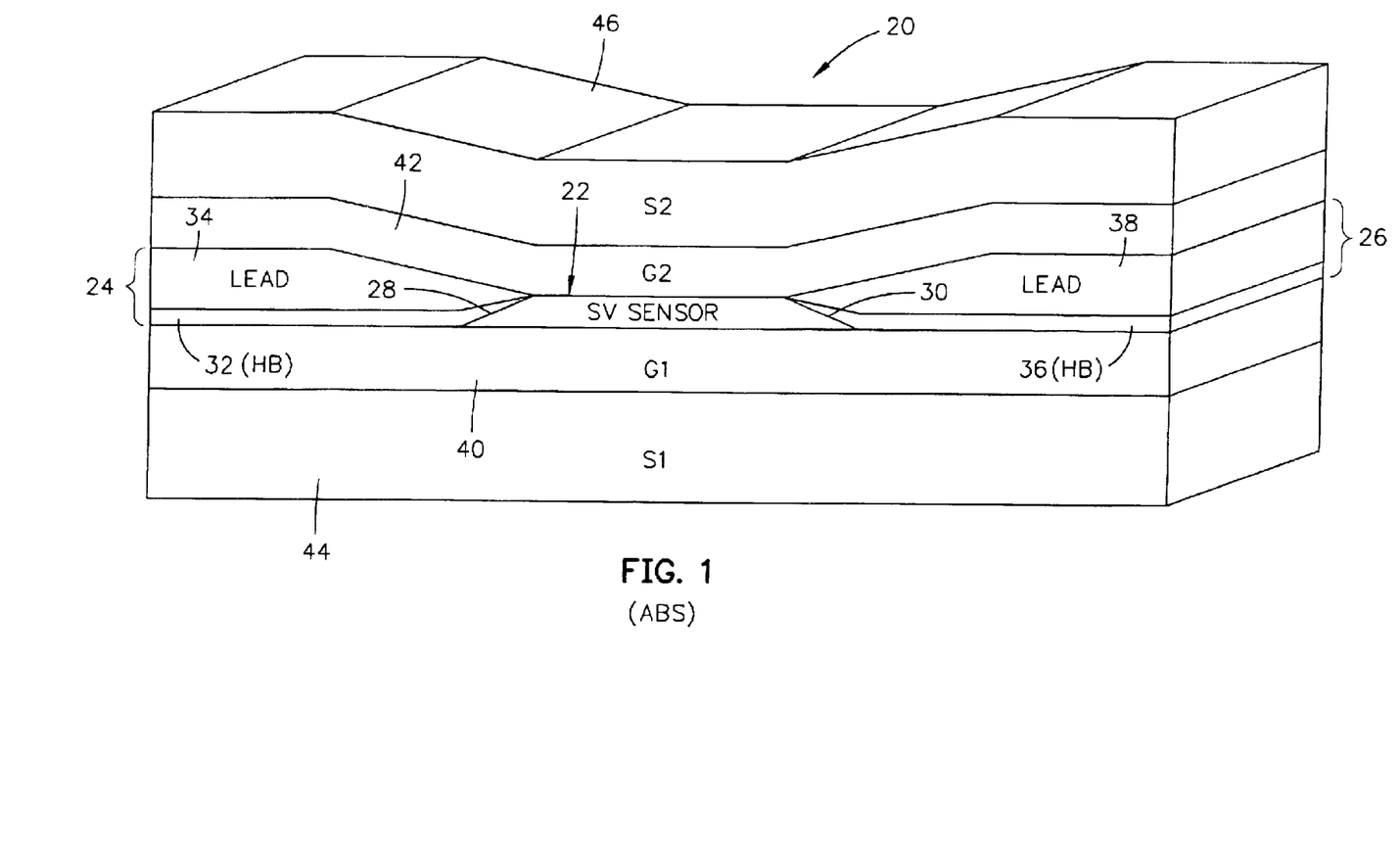
FIG. 1 is an enlarged isometric ABS illustration of a read head with a spin valve sensor.

FIG. 1 is an enlarged isometric ABS illustration of a read head 20 which includes a spin valve sensor 22. First and second hard bias and lead layers 24 and 26 are connected to first and second side edges 28 and 30 of the spin valve sensor. This connection is known in the art as a contiguous junction and is fully described in commonly assigned U.S. Pat. No. 5,018,037 which is incorporated by reference herein. The first hard bias and lead layers 24 include a first hard bias layer (HB) 32 and a first lead layer 34 and the second hard bias and lead layers 26 include a second hard bias layer (HB) 36 and a second lead layer 38. The hard bias layers 32 and 36 cause magnetic fields to extend longitudinally through the spin valve sensor 22 for stabilizing magnetic domains therein. The spin valve sensor 22 and the first and second hard bias and lead layers 24 and 26 are located between nonmagnetic electrically insulative first and second read gap layers (G1) and (G2) 40 and 42. The first and second read gap layers 40 and 42 are, in turn, located between ferromagnetic first and second shield layers (S1) and (S2) 44 and 46.

Prior Art Process

Figure 2:
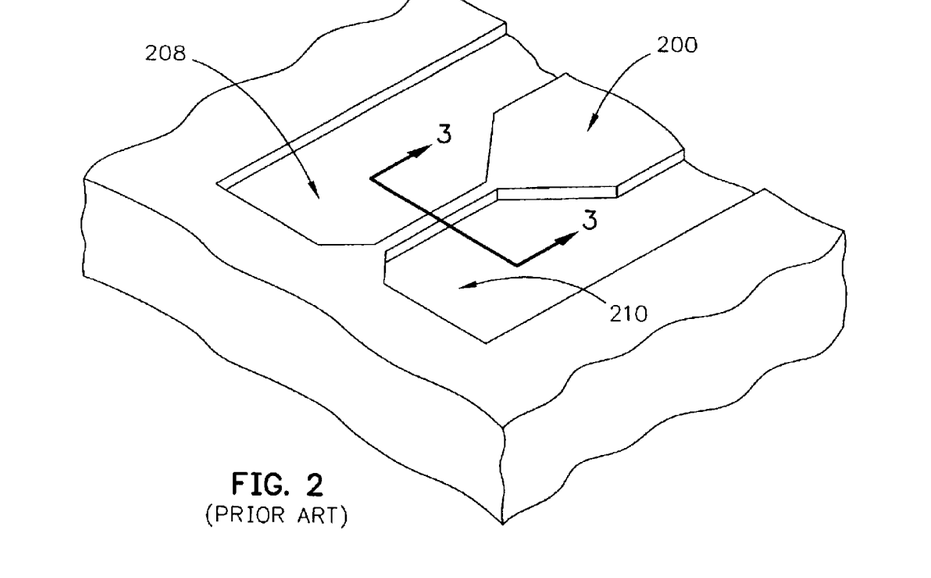
FIG. 2 is an isometric illustration of a prior art bilayer photoresist for defining a track width of a read head and forming hard bias and lead layers.
Figure 3:
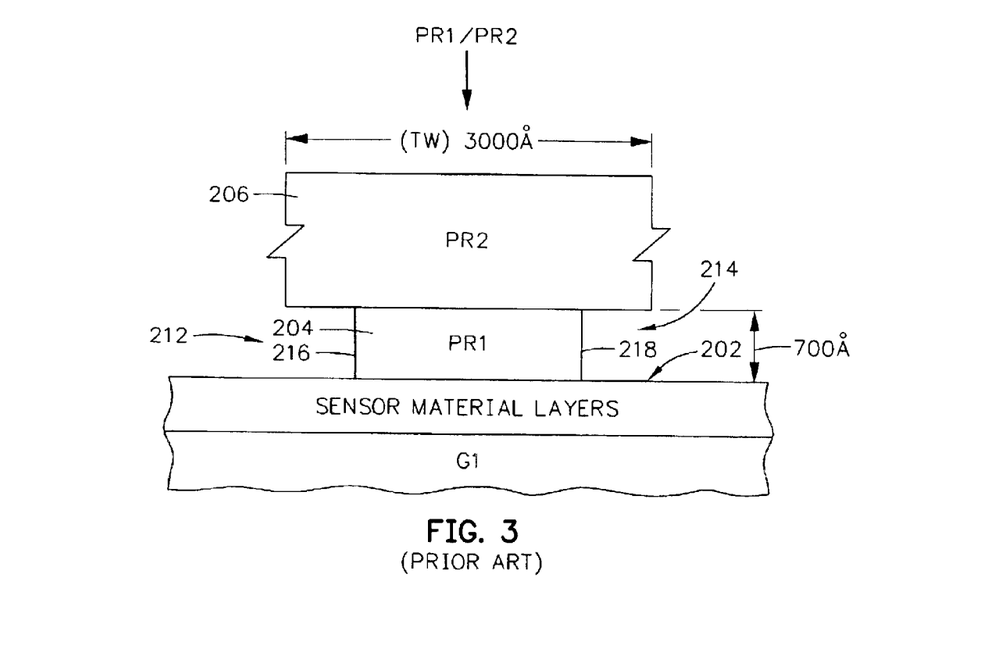
FIG. 3 is a view taken along plane 3—3 of FIG. 2.

FIGS. 2–5 illustrate a prior art process for forming a track width of a sensor of a read head and forming hard bias and lead layers. FIG. 2 is an isometric illustration of a bilayer photoresist 200 which has been formed on sensor material layers 202, as seen in FIG. 3. As shown in FIG. 3, the bilayer photoresist 200 includes a bottom located first photoresist layer (PR1) 204, which is located on the sensor material layers 202, and a top located second photoresist layer (PR2) 206, which is located on top of the photoresist layer 204. As shown in FIG. 2, the bilayer photoresist 200 has first and second openings 208 and 210 which leaves the second photoresist layer 206, as shown in FIG. 3, with a width that defines a track width (TW) of the read head. In the prior art this width has been limited to no less than 0.3 $\mu$m because of process variations in first and second undercuts 212 and 214 and fencing of deposited hard bias and lead materials on first and second recessed edges 216 and 218 of the first photoresist layer 204 which will be described in more detail hereinafter.

Figure 4:
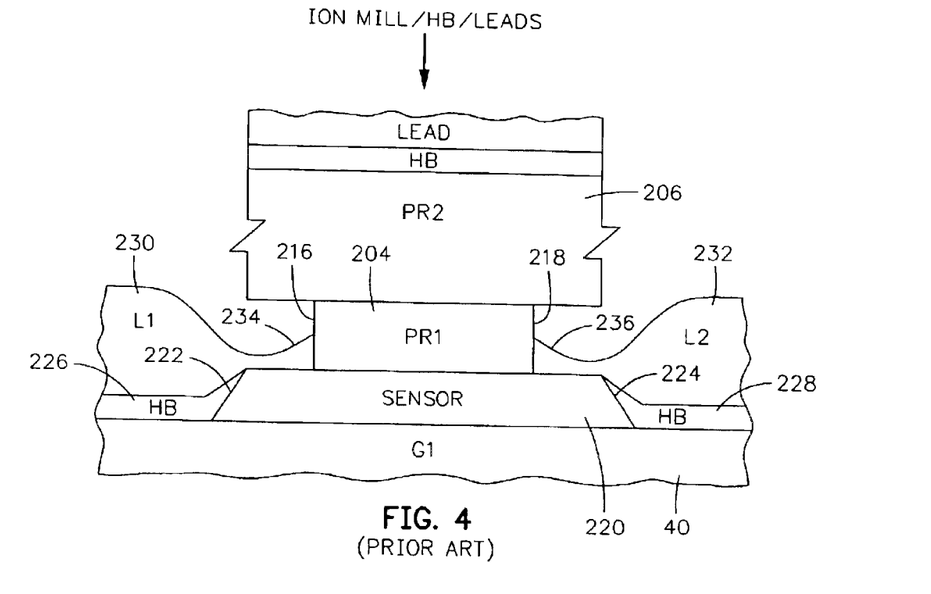
FIG. 4 is the same as FIG. 3 except ion milling has been implemented and hard bias and lead layers have been formed.

FIG. 4 is the same as FIG. 3 except ion milling has been implemented to remove exposed portions of the sensor material layers down to the first gap layer 40 thereby forming a sensor 220 with a desired track width as defined by the location of first and second side edges 222 and 224. The spaces formed by the ion milling are then backfilled with hard bias and lead material which forms first and second hard bias layers (HB) 226 and 228 and first and second lead layers (L1) and (L2) 230 and 232 wherein the first hard bias layer 226 and the first lead layer 230 make a contiguous junction with the side edge 222 of the sensor and the second hard bias layer 228 and the second lead layer 232 make a contiguous junction with the second edge 224 of the sensor.

Figure 5:
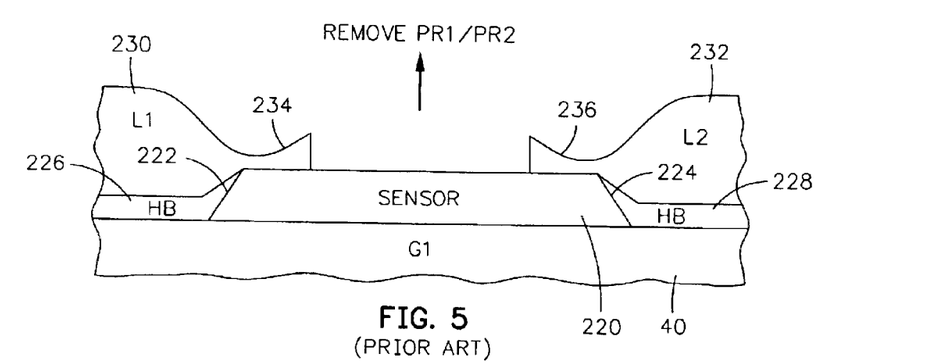
FIG. 5 is the same as FIG. 4 except the bilayer photoresist has been removed.

FIG. 4 illustrates how ion beam sputtered material is deposited on the first and second side walls 216 and 218 of the first photoresist layer to form first and second fences 234 and 236. When the bilayer photoresist is removed, as shown in FIG. 5, the fences 234 and 236 are left free-standing as upwardly projected spikes. Unless the second read gap layer is thick enough to adequately cover these fences 234 and 236 they will project through the second read gap layer and short out the first and second leads to the second shield layer. However, when the second read gap layer is made thicker, this reduces the linear read bit density of the read head which imparts less storage capacity to a magnetic disk drive.

The Invention

Figure 6:
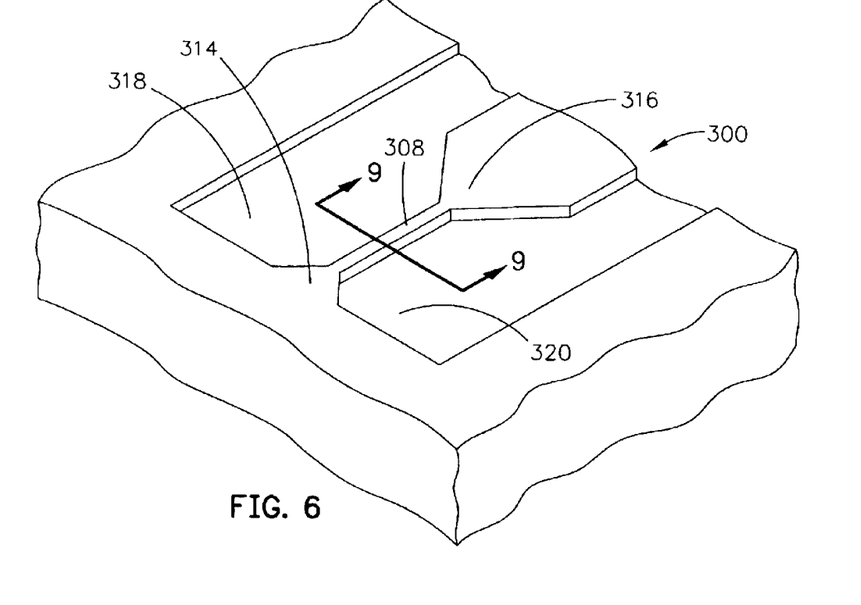
FIG. 6 is an isometric illustration of another bilayer photoresist for defining the track width of the read head and forming hard bias and lead layers.
Figure 7:
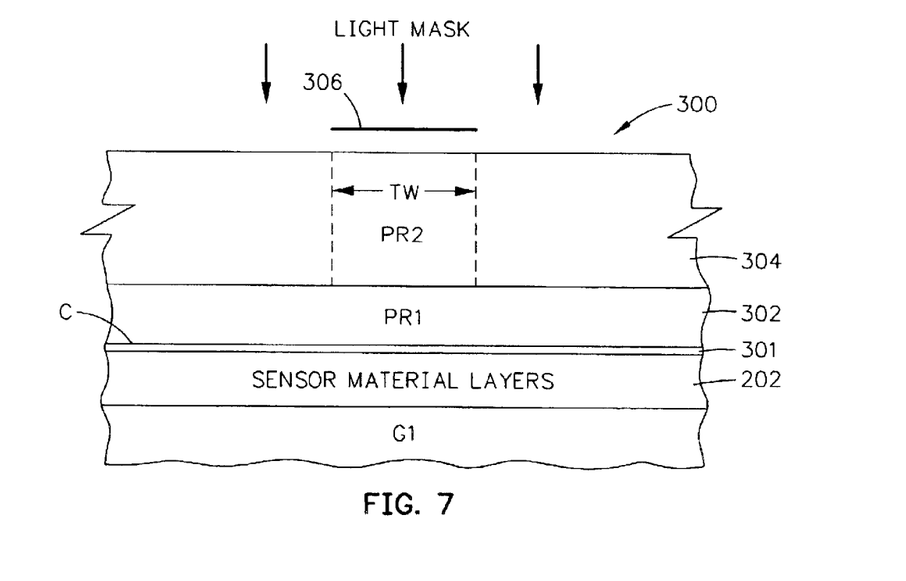
FIG. 7 is a lateral cross section of photoresist layers being light imaged on top of sensor material layers.

FIG. 6 is an isometric illustration of a bilayer photoresist 300 which is located on the aforementioned sensor material layers 202. In a preferred embodiment, as shown in FIG. 7, a protective sacrificial layer 301, which is preferably carbon (C), is formed on the sensor material layer 202 before forming the bilayer photoresist 300. The thickness of the carbon layer 301 may be on the order of 50 Å–100 Å. After forming the carbon layer 301 a non-actinic first photoresist layer (PR1) 302 is spun on the carbon layer and soft baked. Next, an actinic second photoresist layer (PR2) 304 is spun on the wafer on top of the first photoresist layer 302 and then is soft baked. Assuming that the second photoresist layer 304 is a positive photoresist, the layer 304 is light imaged past a mask 306 so that areas beyond the mask are subjected to the light and can be removed by a developer. The width of the mask defines the track width (TW) of the read head.

Figure 8:
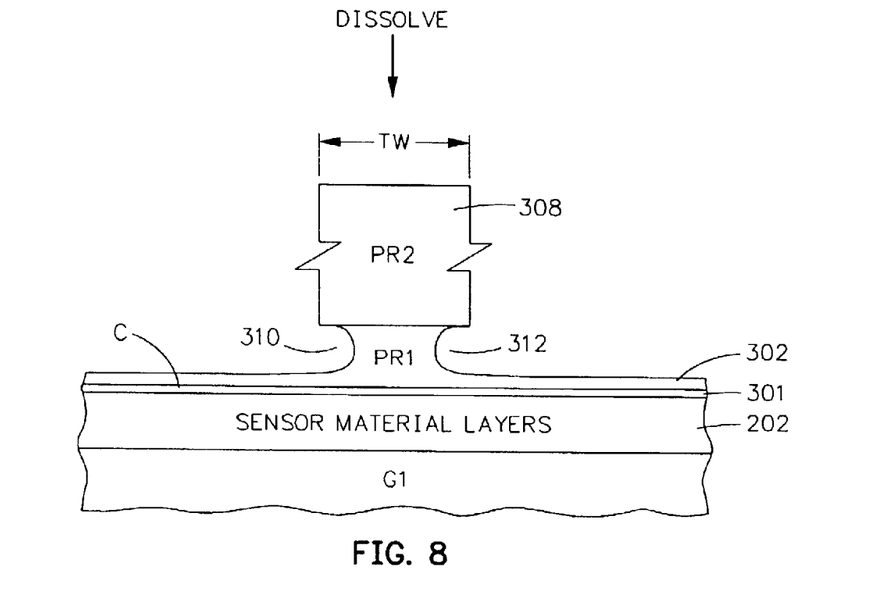
FIG. 8 is the same as FIG. 7 except the bilayer photoresist has been partially dissolved by a dissolver.

In FIG. 8 the wafer is subjected to a dissolver which dissolves the light exposed portions of the second photoresist layer 304 leaving a strip 308 of the second photoresist layer with a width that defines the track width (TW) of the read head and which strip extends into the paper. FIG. 8 also shows the dissolver partially removing the first photoresist layer 302 forming partial undercuts 310 and 312. The process up to this point includes well-known photolithographic process steps in the prior art, except the formation of the carbon layer 301.

Figure 9:
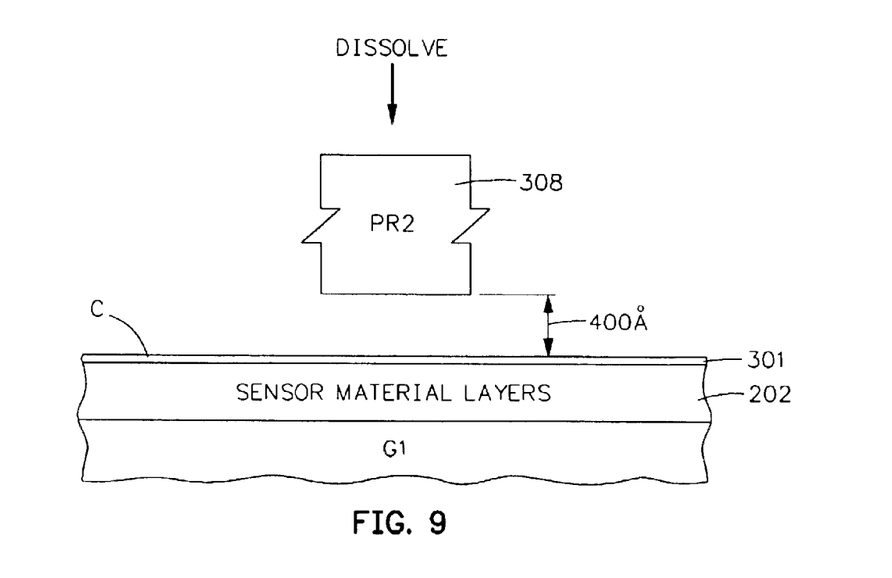
FIG. 9 is the same as FIG. 8 except the first photoresist layer of the bilayer photoresist has been completely dissolved below a strip portion of a second photoresist layer of the bilayer photoresist.

The dissolution process with the dissolver is continued so as to completely dissolve the portion of the first photoresist layer below the photoresist strip 308, as shown in FIG. 9, so that the photoresist strip 308 is a free-standing bridge which extends between and is supported by first and second bilayer photoresist portions 314 and 316, as seen in FIG. 6. The bilayer photoresist portions 314 and 316 include portions of each of the first and second photoresist layers 302 and 304 so that they serve as a support directly on the carbon layer 301. The limitation on the width of the strip 308, which defines the track width (TW) of the read head, is dependent upon the strength of the second photoresist strip 308 to bridge between the supports 314 and 316 in FIG. 6. It has been found that this strength will support a width down to 0.1 $\mu$m which is significantly less than that permitted by the prior art. It is typical in the art that the light imaging step in FIG. 7 and the dissolving step in FIG. 8 forms first and second openings 318 and 320 (see FIG. 6) in the bilayer photoresist 300. The dissolving process in FIGS. 8 and 9 will form an undercut all around the edge of this opening, as shown in FIG. 6, however, a complete undercutting of the second photoresist layer only occurs at the strip 308.

Figure 10:
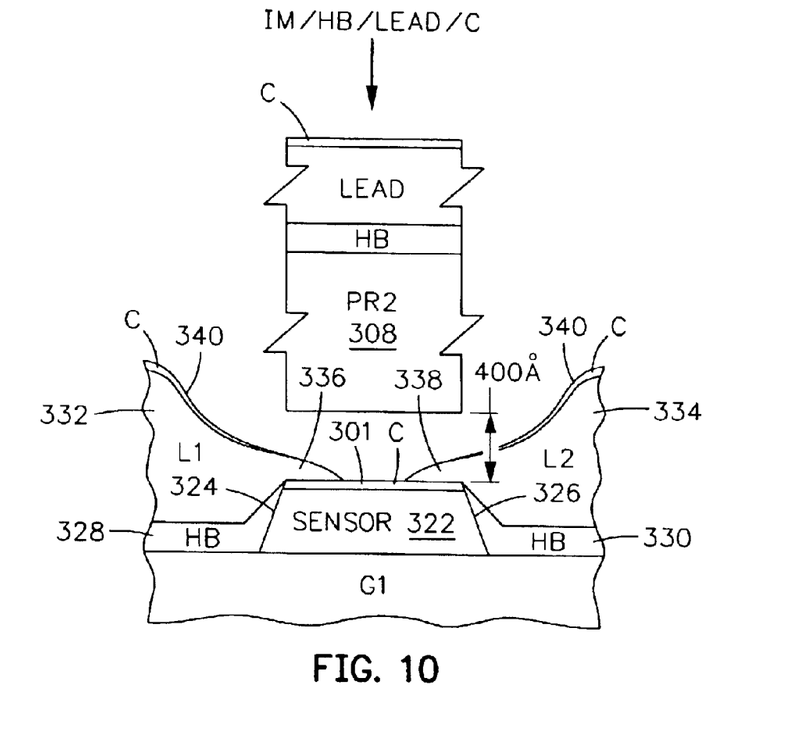
FIG. 10 is the same as FIG. 9 except hard bias, lead and sacrificial protective layers have been formed according to the present invention.

In FIG. 10 ion milling (IM) is implemented to remove exposed portions of the sensor material layer so as to form sensor 322 with side surfaces 324 and 326. Hard bias (HB) and lead materials are then deposited to form first and second hard bias layers (HB) 328 and 330 and first and second lead layers (L1) and (L2) 332 and 334 which abut and make contiguous junctions with side surfaces 324 and 326 of the sensor. It should be noted that the deposition processes form portions 336 and 338 of the first and second lead layers that overlap the sensor 322. In some instances this may include overlapping portions of the first and second hard bias layers 328 and 330. When the width of the second photoresist strip 308 is the desired track width (TW) of the read head, the portions 336 and 338 are undesirable and should be removed. The present invention provides a process for such removal.

Figure 11:
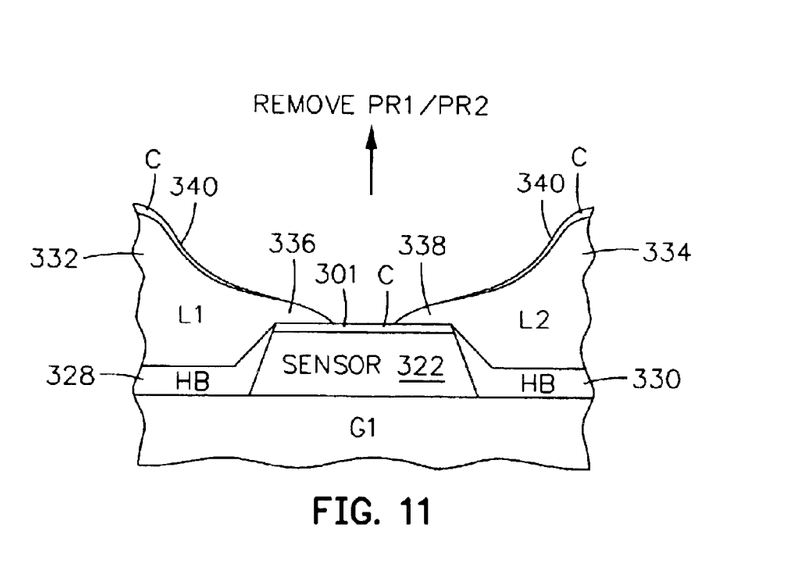
FIG. 11 is the same as FIG. 10 except the bilayer photoresist has been removed.
Figure 12:
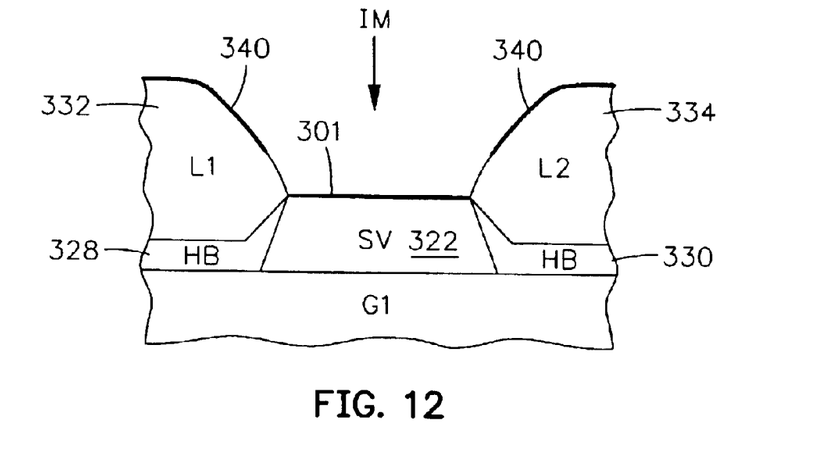
FIG. 12 is the same as FIG. 11 except ion milling has been implemented to remove overlapping portions of layers deposited on the spin valve sensor.
Figure 13:
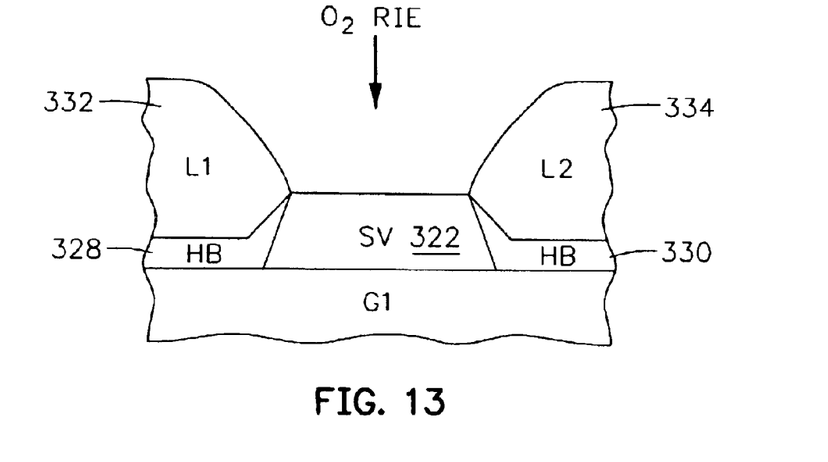
FIG. 13 is the same as FIG. 12 except reactive ion etching has been implemented to remove any remaining portions of the sacrificial protective layers.

In FIG. 10 a second protective sacrificial carbon (C) layer 340 may be deposited which covers the first and second lead layers 332 and 334 without covering the lead layer portions 336 and 338 below the photoresist strip 308. In FIG. 11 the bilayer photoresist is removed and in FIG. 12 ion milling (IM) is implemented for removing the overlapping portions 336 and 338. During this milling the first sacrificial protective layer 301 protects the sensor while the second sacrificial protective layer 340 protects the first and second leads 332 and 334. These protective layers are shown as heavy lines in FIG. 12 since they are thinned down to some extent but not necessarily removed. In FIG. 13 oxygen ($O_2$) reactive ion etching (RIE) is implemented to remove the remaining first and second sacrificial protective layers 301 and 340. After the step in FIG. 13 the second read gap layer 42 and the second shield layer 46 may be formed, as shown in FIG. 1, to complete the read head.

Discussion

The top photoresist layer 304 in FIG. 7 may be Novalak resin plus a photoactive compound, which can be obtained from Shipley, and the bottom photoresist layer 302 in FIG. 7 may be a polymide or PMGI, which is an abbreviation for polymethylamide, and may be obtained from Shipley. The dissolution of the exposed portions of the second photoresist layer and the first photoresist layer in FIGS. 7–9 can be accomplished with a basic solution. The rate of dissolution of the exposed portions of the top photoresist layer 304 (see FIG. 7) depends upon the exposure energy during the light exposure step, the focus position, the molecular weight of the second photoresist layer and the amount of photo-actinic material left in the second photoresist layer after the soft baked cycle. The rate of dissolution of the bottom photoresist layer 302 (see FIG. 7) depends primarily upon the molecular weight of the first photoresist layer and its baked cycle. These parameters are well known in the prior art. The invention also includes forming the sensor and the first and second lead layers between the first and second read gap layers 40 and 42 and forming the first and second read gap layers between the first and second shield layers 44 and 46 as shown in FIG. 1. Further, the sensor can be a spin valve sensor or a tunnel junction sensor.

It should be understood that other sacrificial protective layers may be employed in lieu of carbon, such as silicon dioxide ($SiO_2$), which may be removed by fluorine reactive ion etching. It should further be understood that the invention may be employed for fabricating elements other than a sensor where a lift off process is employed, such as forming lead layers for a read head.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a read head comprising the steps of:
    forming sensor material layers;
    forming a bottom photoresist layer directly on the sensor material layers;
    forming a top photoresist layer directly on the bottom photoresist layer;
    forming the bottom and top photoresist layers with first and second spaced apart support portions;
    forming the top photoresist layer with a strip portion that extends between the first and second support portions;
    forming the strip portion without the bottom photoresist layer therebelow so that the strip portion bridges between the first and second support portions with a space between the strip portion and the sensor material layers;
    removing first and second portions of the sensor material layers on each side of the strip leaving a sensor below the first and second side surfaces;
    forming first and second leads abutting the first and second side surfaces of the sensor;
    removing said strip portion and the first and second support portions;
    before forming the bottom photoresist layer, forming a first sacrificial protective layer on the sensor material layers;
    before removing the strip portion and the first and second support portions, forming a second sacrificial protective layer on the first and second lead layers; and
    after removing the strip portion and the first and second support portions, milling away any first and second lead layer portion overlapping the sensor with a remaining portion of the first sacrificial layer on the sensor protecting the sensor from said milling and the second sacrificial layer protecting the first and second lead layers except for said first and second lead layer portions overlapping the sensor.

2. A method of making a read head as claimed in claim 1 wherein the bottom photoresist layer is formed of a nonactinic photoresist and the top photoresist layer is formed of an actinic photoresist.

3. A method of making a read head as claimed in claim 2 wherein the bilayer photoresist mask is formed with first and second openings which define the first and second support portions and the strip portion.

4. A method of making a read head as claimed in claim 3 wherein at the first and second support portions the top photoresist layer is formed to overhang the bottom photoresist layer.

5. A method as claimed in claim 4 wherein each of the first and second sacrificial layers is composed of carbon.

6. A method of making a structure wherein the structure includes an underlying layer comprising the steps of:
    making a bilayer liftoff mask on the underlying layer comprising the steps of:
        forming a bottom photoresist layer of an actinic photoresist on the underlying layer;
        forming a top photoresist layer of a nonactinic photoresist on the bottom photoresist layer;
        exposing the top photoresist layer with light to define the top photoresist layer with a strip portion and spaced apart first and second support portions with the strip portion extending between the first and second support portions; and
        subjecting the top photoresist layer to a developer to dissolve portions of the top photoresist layer so as to form the top photoresist layer with said strip portion and top portions of said first and second support portions and then subjecting the bottom photoresist layer to the developer which forms bottom portions of the first and second support portions and which dissolves the bottom photoresist layer below said strip portion so that the strip portion bridges between said first and second support portions and is spaced from said underlying layer;
    ion milling to remove exposed portions of the underlying layer not covered by the bilayer photoresist mask so as to provide first and second openings in the underlying layer; and sputter depositing at least one thin film layer in the first and second openings;

removing the bilayer photoresist mask with a portion of said at least one thin film layer thereon leaving a remaining underlying layer portion with no portion of said at least one thin film layer thereon;

before making said bilayer photoresist layer, forming a first sacrificial protective layer on the underlying layer;

before removing said bilayer photoresist mask, forming a second sacrificial protective layer on said at least one thin film layer; and after removing the bilayer photoresist mask, milling away any thin film layer material overlapping said remaining underlying layer portion with a remaining portion of the first sacrificial protective layer directly on the remaining underlying layer portion protecting the remaining underlying layer portion from said milling.

7. A method of making a structure as claimed in claim 6 further comprising the step of:

removing any remaining portions of the first and second sacrificial protective layers by reactive ion etching.

8. A method of making a structure as claimed in claim 7 wherein each of the first and second sacrificial protective layers is formed of carbon and the reactive ion etching is oxygen reactive ion etching.

9. A method of making a structure as claimed in claim 6 wherein the underlying layer is sensor material layers, the remaining underlying layer portion is a sensor and said at least one thin film layer is first and second hard bias layers and first and second lead layers with the first hard bias layer and the first lead layer adjacent a first side surface of the sensor and the second hard bias layer and the second lead layer adjacent a second side surface of the sensor.

10. A method as claimed in claim 9 further including the steps of:

forming first and second read gap layers with the sensor and the first and second lead and hard bias layers located therebetween; and forming first and second ferromagnetic shield layers with the first and second read gap layers located therebetween.

11. A method of making a structure as claimed in claim 10 further comprising the step of:

removing any remaining portions of the first and second sacrificial protective layers by reactive ion etching.

12. A method of making a structure as claimed in claim 11 wherein each of the first and second sacrificial protective layers is formed of carbon and the reactive ion etching is oxygen reactive ion etching.

\* \* \* \* \*